US006048081A

United States Patent [19]
Richardson

[11] Patent Number: 6,048,081
[45] Date of Patent: Apr. 11, 2000

[54] BEAM DIVERGENCE AND SHAPE CONTROLLING MODULE FOR PROJECTED LIGHT

[76] Inventor: Brian Edward Richardson, 18675-K Adams Ct., Morgan Hill, Calif. 95037

[21] Appl. No.: 09/097,853

[22] Filed: Jun. 15, 1998

[51] Int. Cl.[7] .................................................. F21V 5/00
[52] U.S. Cl. .......................... 362/307; 362/268; 362/282; 362/355; 359/353; 359/599
[58] Field of Search .................................... 362/268, 331, 362/332, 355, 280, 282, 284, 322, 323, 324; 359/599, 615, 813, 814

[56] References Cited

U.S. PATENT DOCUMENTS

| 4,855,884 | 8/1989 | Richardson | 362/278 |
| 5,465,175 | 11/1995 | Woodgate et al. | 359/463 |
| 5,594,526 | 1/1997 | Mori et al. | 355/67 |
| 5,855,884 | 3/1992 | Van Den Brandt et al. | 353/102 |

*Primary Examiner*—Sandra O'Shea
*Assistant Examiner*—Ali Alavi
*Attorney, Agent, or Firm*—The Kline Law Firm

[57] ABSTRACT

A lighting module that diffuses a light beam to modify the size and shape of the projected beam. The device includes a light source and a reflector to direct the light along an optic path. A primary lens element reduces the cross section of an effected light region as the light enters a diffusion assembly area in the optic path. Diffusion elements in the diffusion assembly are deployed in varying combinations and to varying degrees to produce the shape and/or size of light beam desired by the user. The action of the lens element allows the diffusion elements to be physically positioned in the optic path but to have no effect on the light until the diffusion elements are rotated so that diffusion element segments align with lens segments, and the diffusion element changes the light being projected from the lighting module.

13 Claims, 22 Drawing Sheets

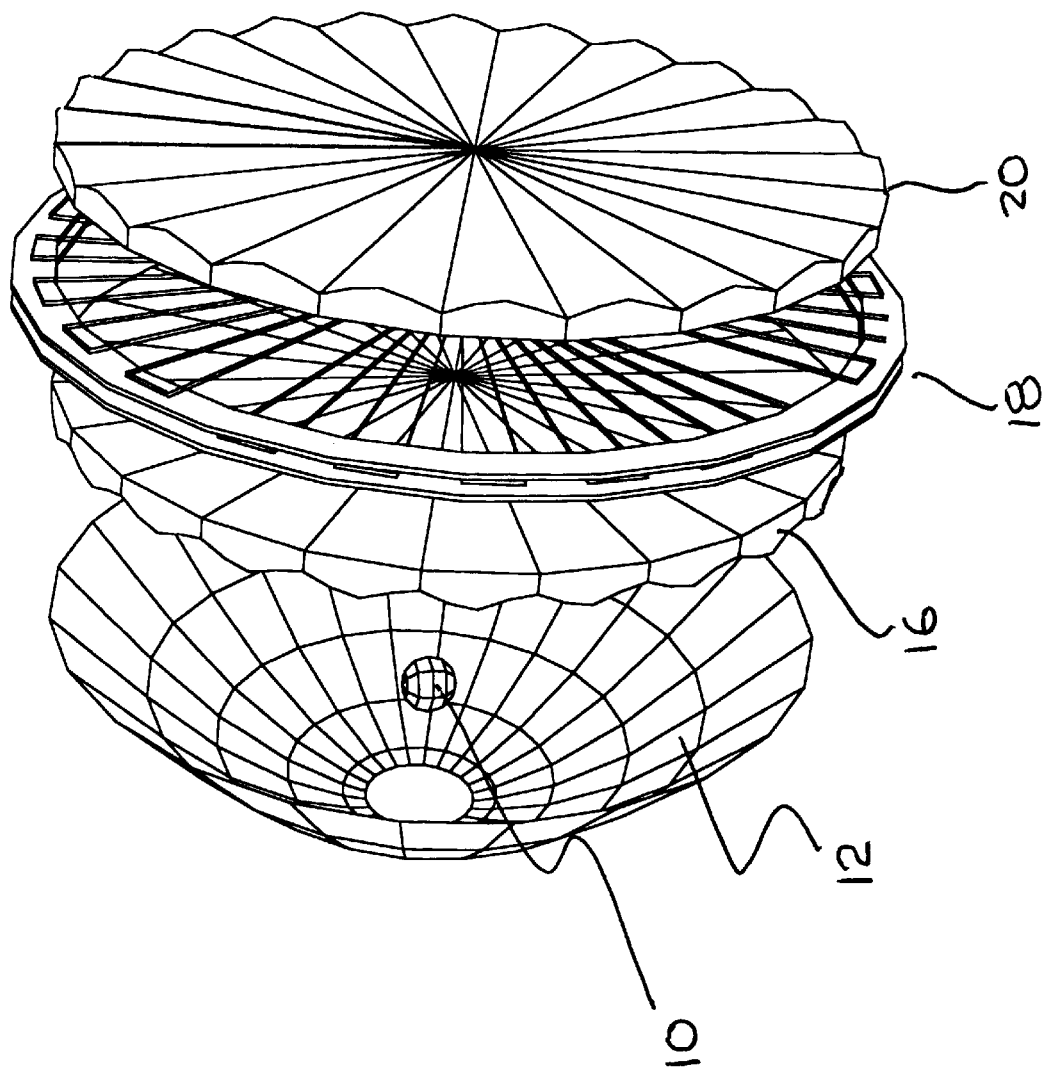

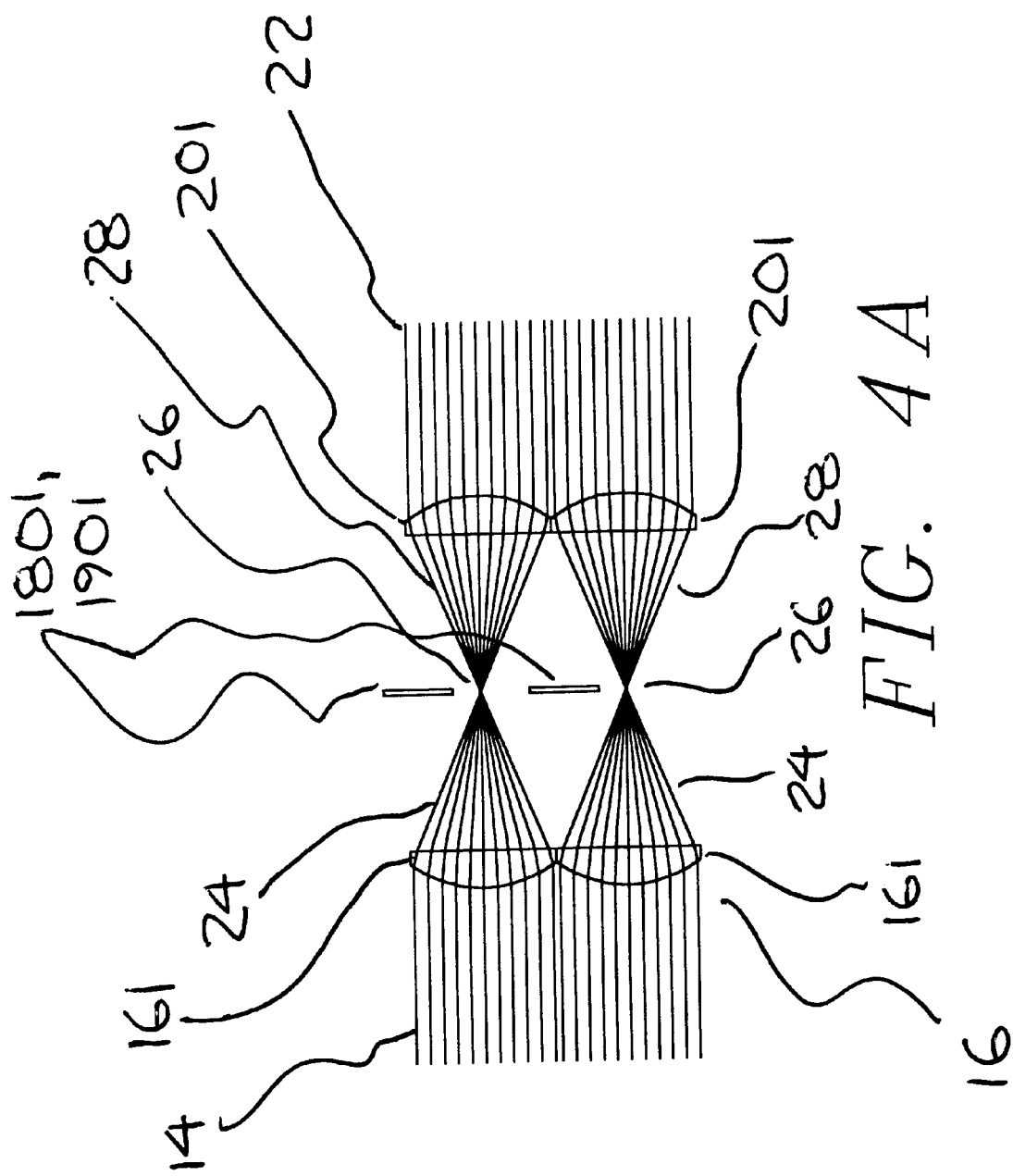

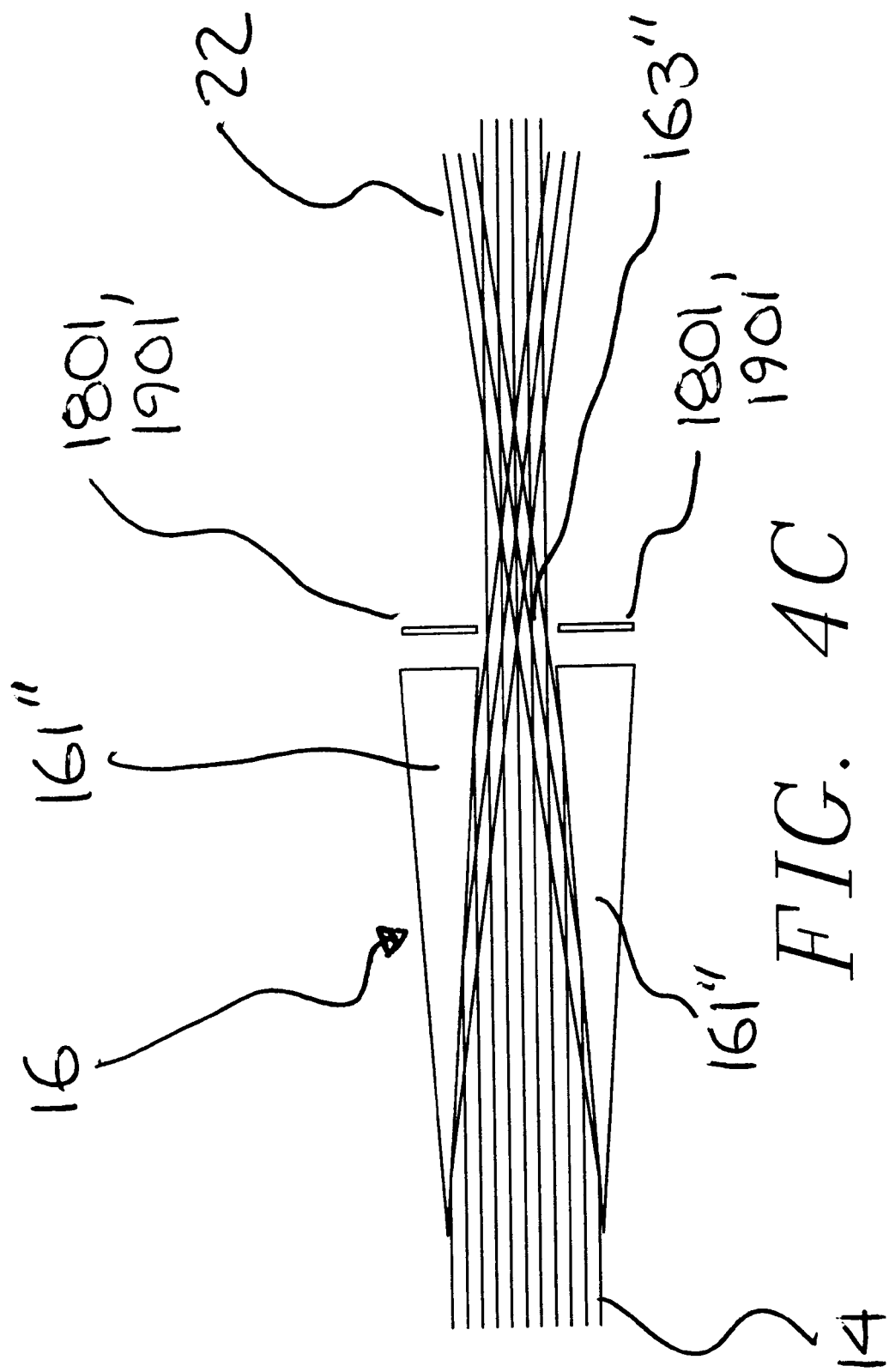

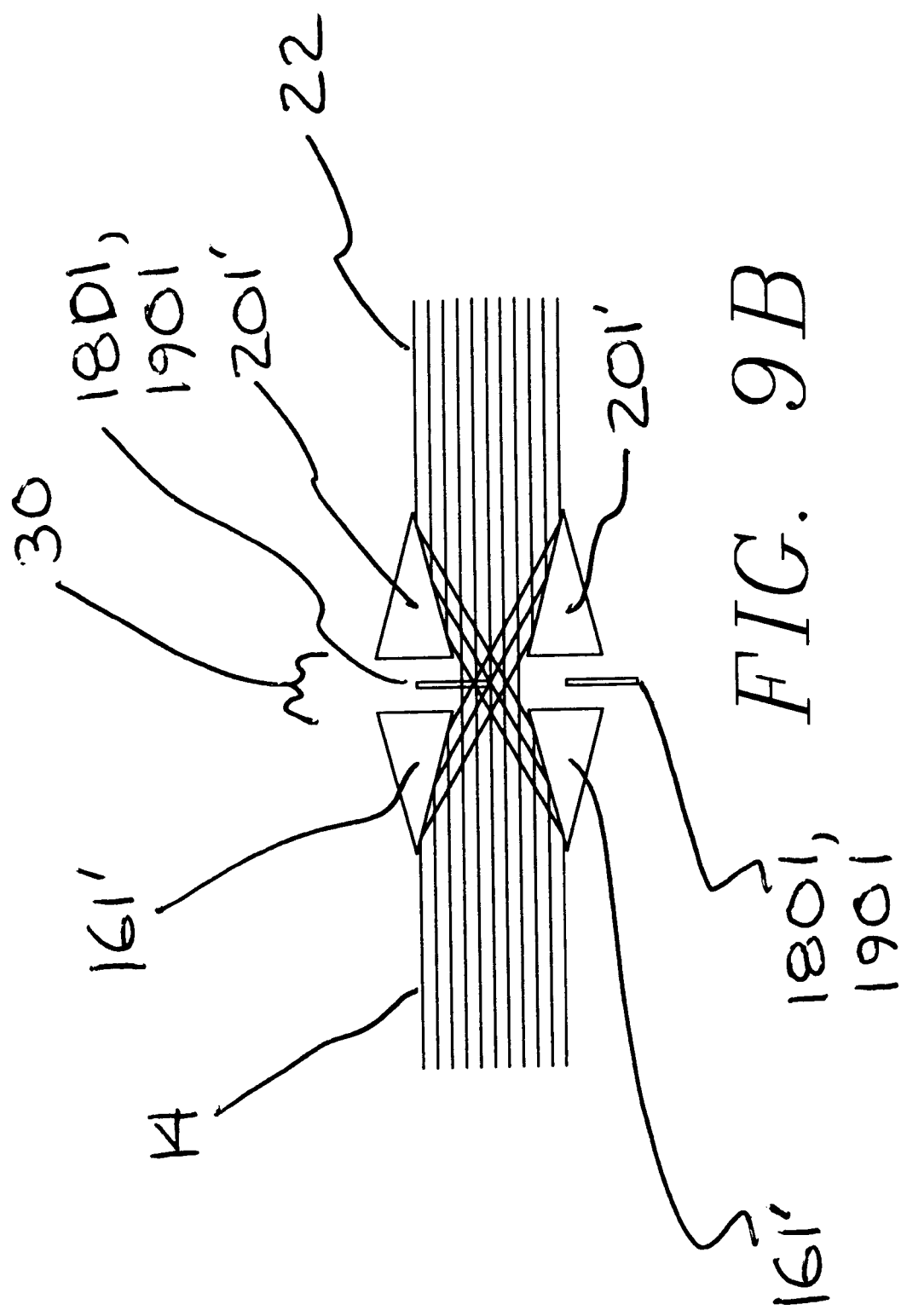

BEAM DIVERGENCE AND SHAPE CONTROLLING MODULE FOR PROJECTED LIGHT

FIELD OF THE INVENTION

This invention relates generally to entertainment and architectural lighting, and more specifically is a device to change the divergence and/or shape of a beam of light emanating from a light source.

BACKGROUND OF THE INVENTION

Theatrical, television, touring productions, and architectural lighting sources often include lighting devices that emit a light beam with different divergences. The light beam divergence is used to obtain a particular desired artistic objective. The artistic requirements may require that the beam divergence remain static or that it change over time. Cost, speed of changing, smoothness of changing, compact size, weight, and efficiency of transmitting light are all factors in the practical usage of a beam divergence module. Further, changing the shape of the projected beam from round to oval is a desired attribute of a beam divergence module. The changing of shape is required to create a circular spot when the light is projected on a surface that is not perpendicular to the beam.

In the past, the divergence of a light source was changed by manually replacing the light source type to obtain a specific artistic result. The use of a specific lamp for each type of divergence sought makes it impractical to change the divergence of the light source during a performance. Therefore more overall lighting fixtures are required to accomplish the desired artistic results.

To change the orientation of an oval shaped beam one would need to manually change the radial orientation of the light source.

Accordingly, inventors have created several methods to remotely change the divergence of a light beam. U.S. Pat. No. 4,855,884, issued Aug. 8, 1989, to the present inventor Richardson, discloses an improved reflector that changes beam divergence. This invention is limited in that it does not allow for the changing of the shape of the beam and is limited in the range of size produced.

U.S. Pat. No. 4,973,306, issued Nov. 20, 1990, to Bornhorst, discloses a series of diffusion panels that are introduced from the sides of a beam of light. This creates various beam divergences, however, this fails to create a range of beams with a smooth field of illumination. Further, this system comprises a complex mechanism that is costly and unreliable. It also provides no method to change beam shape.

U.S. Pat. No. 5,073,847, also to Bornhorst, discloses another diffusion mechanism. A series of rotatable diffusion panels are arranged in a radial array. Rotation of the panels into the light path diffuse the light beam. This mechanism also proves to be expensive and provides no method to shape the beam. There is also an insufficient range of beam sizes to provide a smooth transition from narrow to full diffusion.

U.S. Pat. No. 5,665,305, issued Sep. 9, 1997, to Belliveau, et al., discloses a method of intervening one or two lenticular panels to change beam divergence and/or beam shape. These panels are oriented so as to be orthogonal to one another when engaged. This method does not allow for continuous changes in beam size or shape.

Accordingly, it is an object of the present invention to provide a light beam divergence and shaping module that is compact, and that is inexpensive to produce and to maintain. The module is of simple construction, and is therefore very reliable.

It is a further object of the present invention to provide a module that provides a wide range of beam divergence, and that changes from one divergence to another quickly and smoothly.

It is a still further object of the present invention to provide a device that efficiently transmits light.

SUMMARY OF THE INVENTION

The present invention is a lighting module that diffuses a light beam to modify the size and shape of the projected beam. The device includes a light source and a reflector to direct the light along an optic path. A primary lens element reduces the cross section of an effected light region as the light enters a diffusion assembly area in the optic path. Diffusion elements in the diffusion assembly are deployed in varying combinations and to varying degrees to produce the shape and size of light beam desired by the user. The action of the lens segment allows the diffusion elements to be physically positioned in the optic path but to have no effect on the light until the diffusion elements are rotated so that diffusion element segments align with lens segments, and the diffusion element changes the light being projected from the lighting module.

An advantage of the present invention is that it provides a single, compact unit that allows the user to project various sizes and shapes of light beams. This eliminates the need for multiple pieces of equipment.

Another advantage of the present invention is that it is simple and inexpensive to manufacture and is therefore reliable and easy to maintain.

Still another advantage of the present invention is that the lens segments allow the diffusion elements to be installed in the optic path, the diffusion elements having no effect when in a non-deployed position.

These and other objects and advantages of the present invention will become apparent to those skilled in the art in view of the description of the best presently known mode of carrying out the invention as described herein and as illustrated in the drawings.

BRIEF DESCRIPTION OF THE DRAWINGS

FIG. 1 is a prospective view of the divergence and shaping module the present invention, including an accompanying light source.

FIG. 4A shows a segment of the optical ray trace of the system with two refractive optical elements.

FIG. 4C shows a segment of the optical ray trace of another alternate system with one reflective optical element.

FIG. 9B shows a segment of the optical ray trace of the double reflective element system with a diffusion segment partially deployed in the light path.

DETAILED DESCRIPTION OF THE INVENTION

Figure 1A:
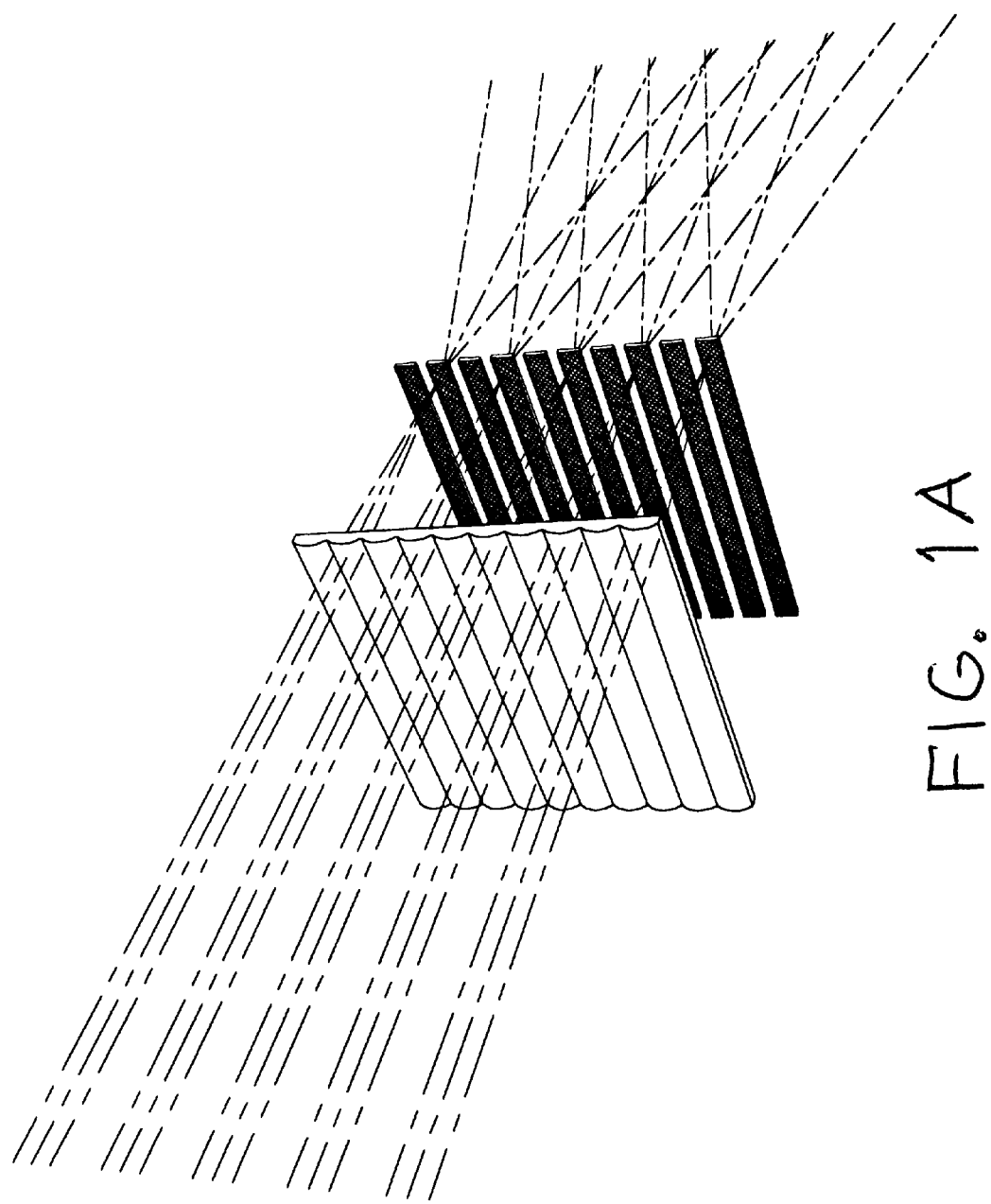
FIG. 1A shows a linear array system.
Figure 1B:
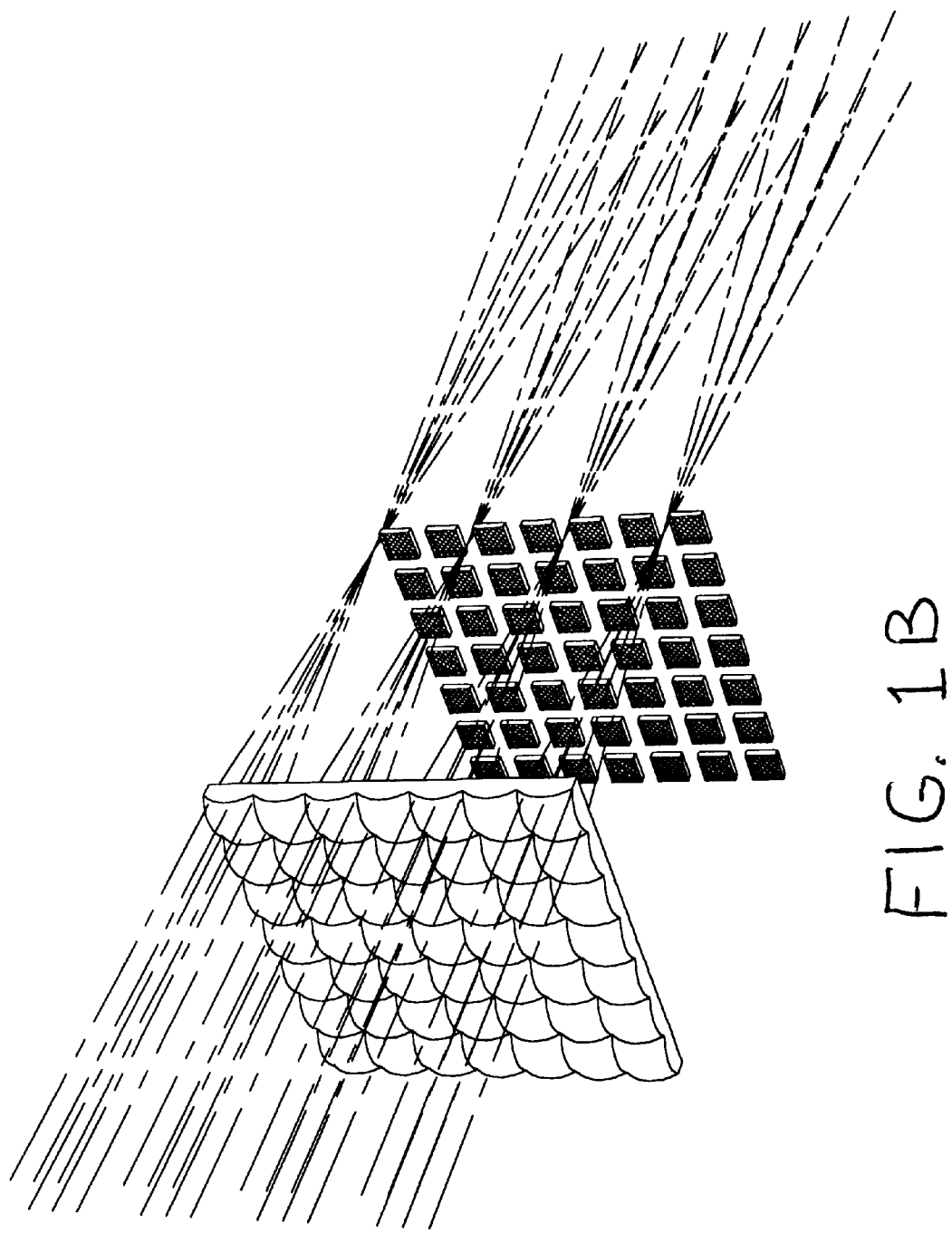
FIG. 1B shows a matrix array system.
Figure 2:
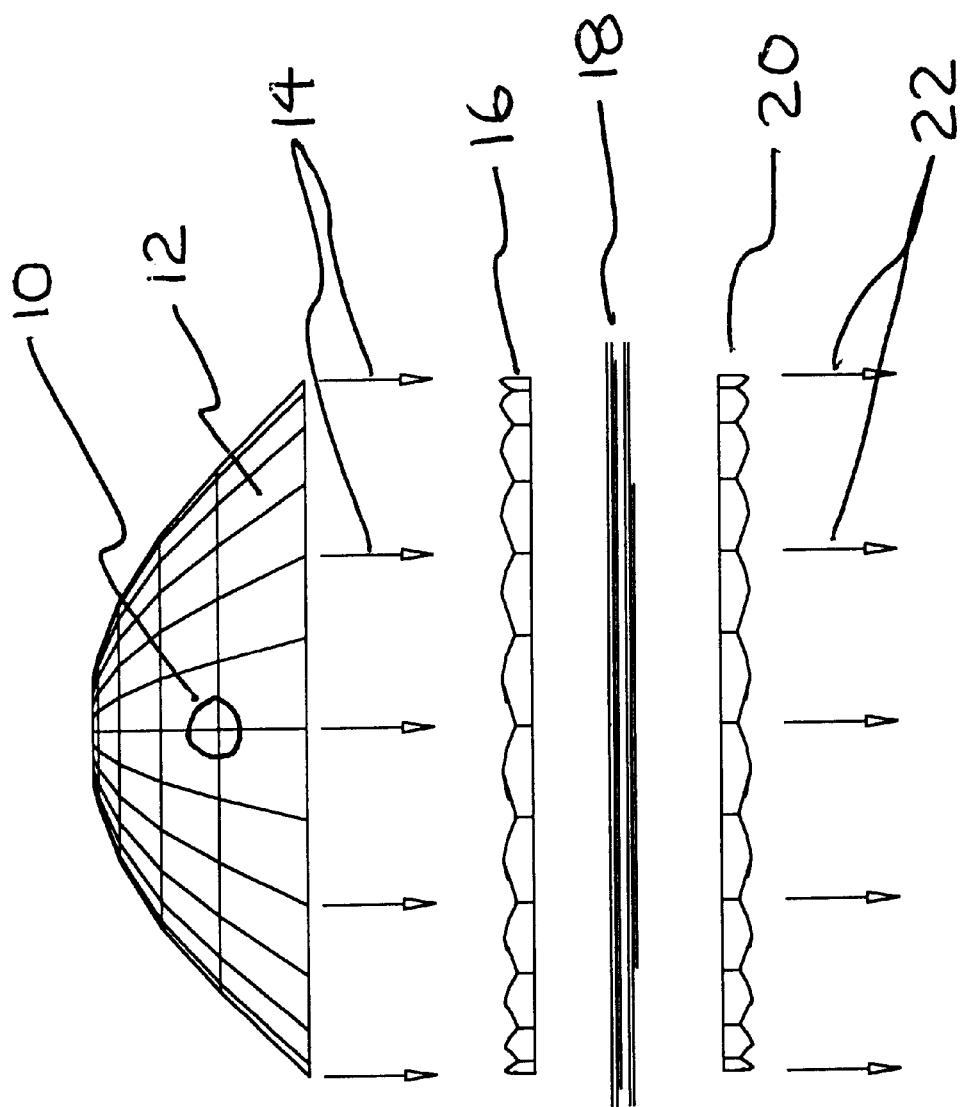
FIG. 2 is a plan view and the relationship of the various key components of the module of the present invention.

The present invention is a light beam divergence and shape controlling module used in conjunction with a light source as is illustrated in FIGS. 1 and 2. Referring first to FIG. 1, a light source 10 is shown for reference in describing the operation of the system. The source may be of any type or size, and would be known by persons knowledgeable in the art. The light source 10 is located within a reflector 12. The reflector 12, as is the case with the light source 10, may be of any common type or size. A parabolic reflector is depicted in the drawings. Any light source that generates generally parallel light, such as a light source with a condenser lens, can also be used in the module. These light sources are well known to those skilled in the art.

Inbound light rays 14 (see FIG. 2) emanate from the reflector 12 in substantially parallel paths along an optical path including a primary optical element 16, a diffusion element 18, and a secondary optical element 20. The light rays exit the secondary optical element 20 as outbound light rays 22.

Figure 3A:
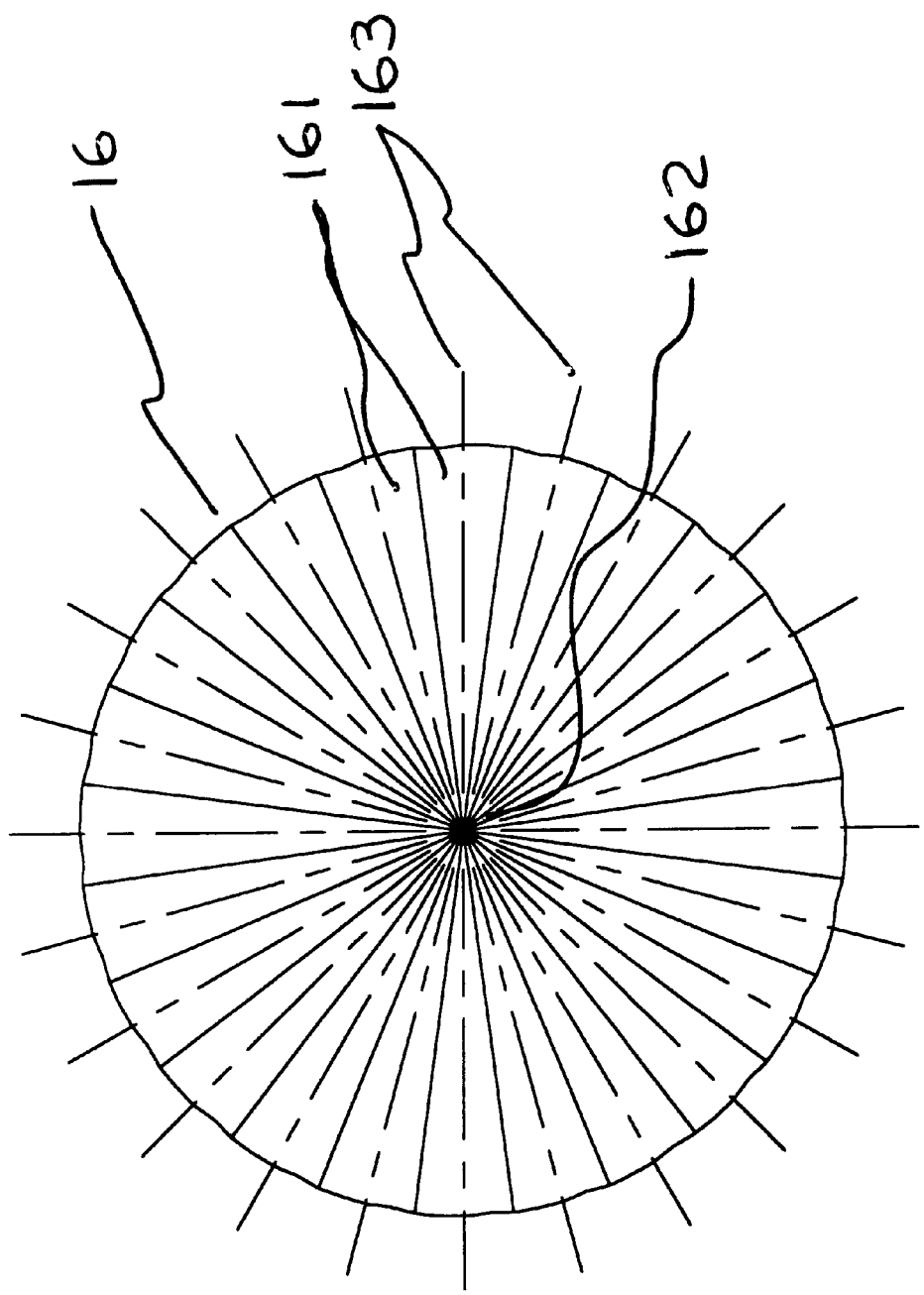
FIG. 3A depicts the primary optical element as viewed along the optical axis.
Figure 3B:
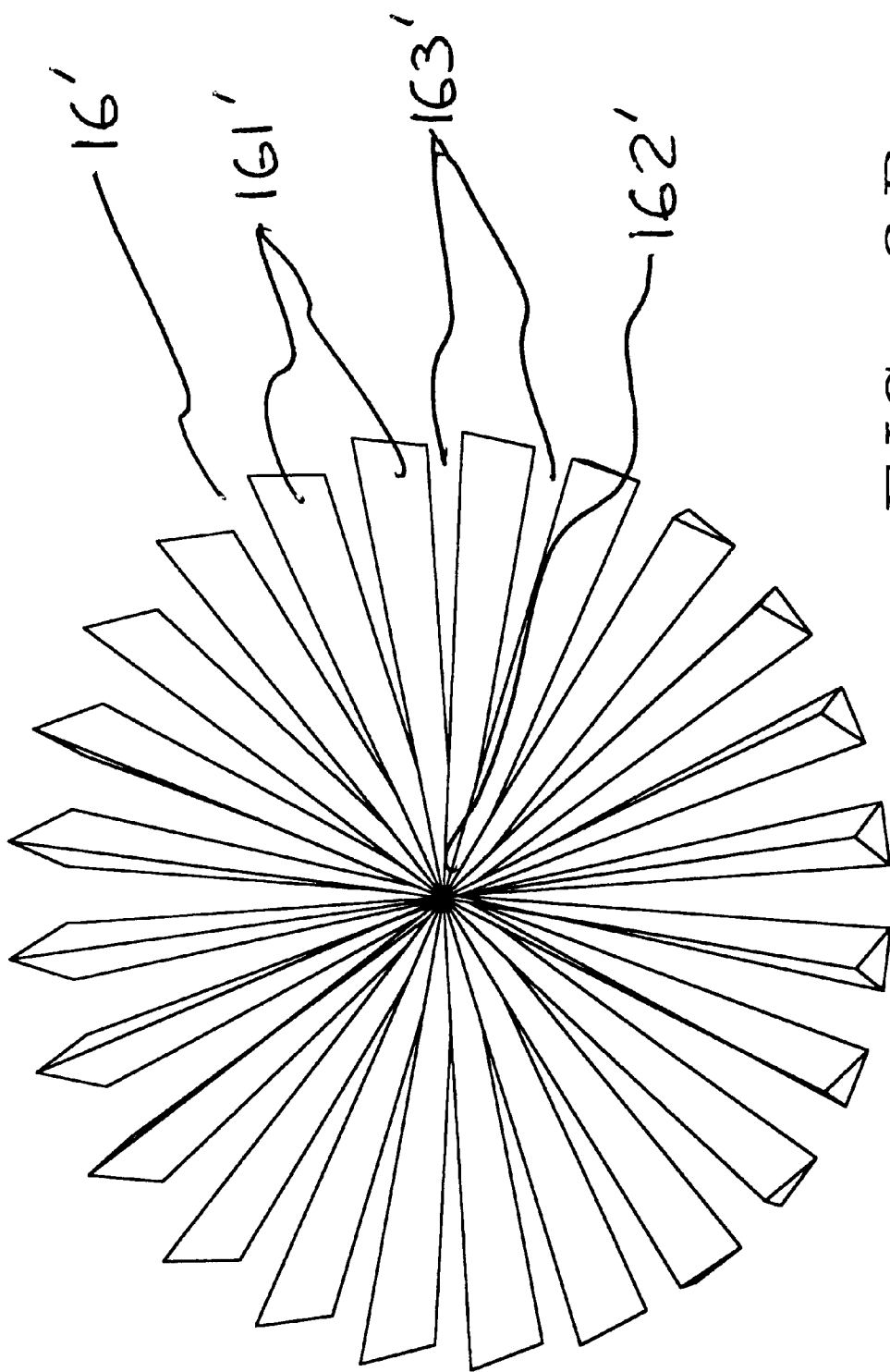
FIG. 3B is a perspective view of an alternate primary optical element.
Figure 3C:
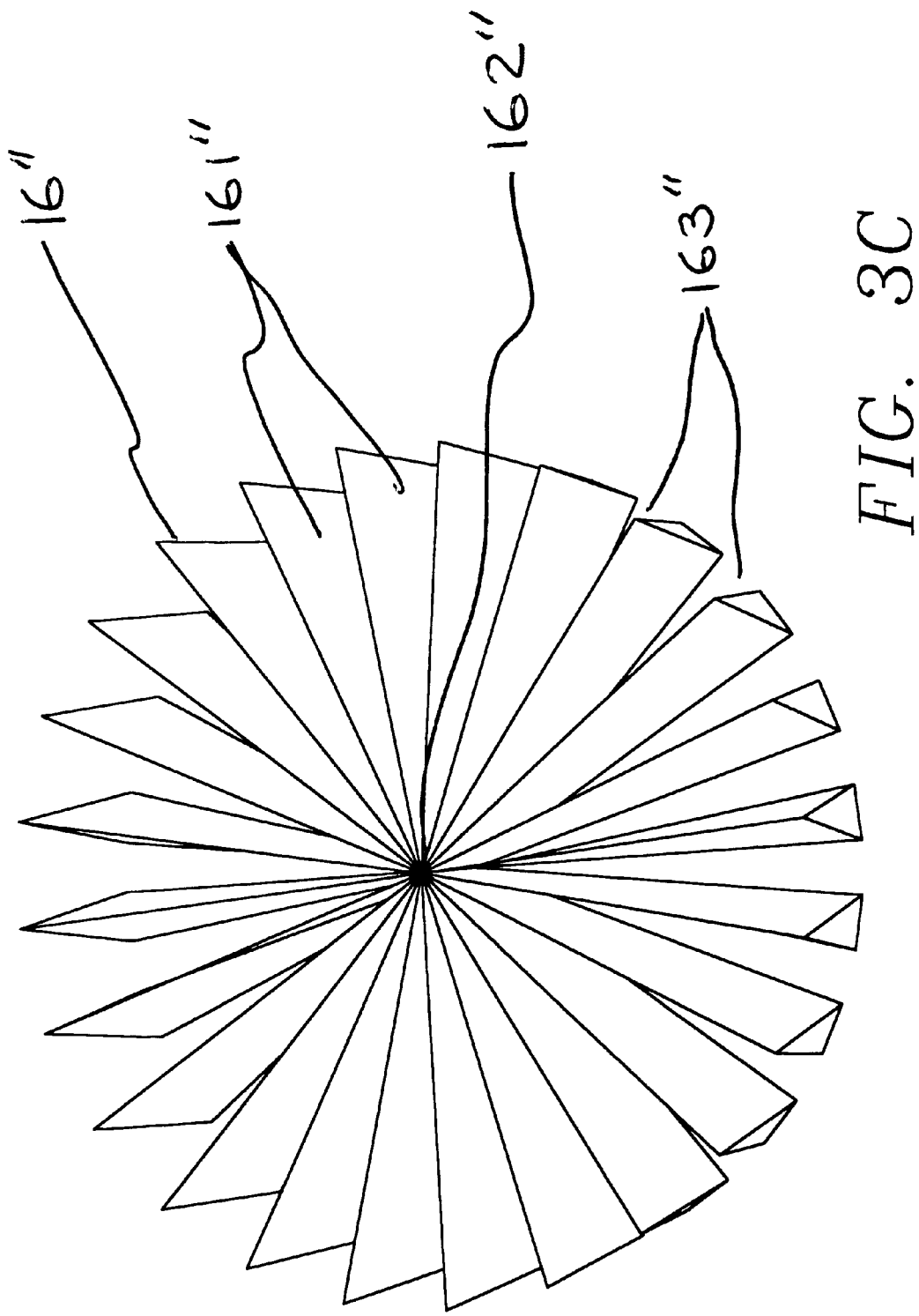
FIG. 3C is a perspective view of another alternate primary optical element.

A lens segment 161 of the primary optical element 16 is shown in detail in FIG. 3A, as viewed in its position along the optical path longitudinal axis. In the preferred embodiment of the invention, the primary optical element 16 is comprised of twenty-four identical lens segments 161. The lens segments 161 are wedge shaped, and they are positioned adjacent to one another radially around a center 162 of the primary optical element 16. A focal line 163 of each of the lens segment 161 originates at the center 162 of the optical element 16, and emanates outward along a longitudinal center of the lens 161. The primary optical element 16 is preferably a unitary element formed from a solid piece of material, typically by a molding process. FIGS. 3B and 3C show alternate constructions for the primary optical elements.

FIG. 4A is a ray trace that shows a side view of a pair of typical lens segments 161. Shown are the inbound light rays 14 entering from the left and striking the lens 161. Refracted light rays 24 exit the lens 161 and converge at focal point 26. All the focal points 26 lie on the corresponding focal lines 163 of the lens segments 161. The light rays then become divergent light rays 28 as they exit the focal point 26 and strike a lens segment 201 of the secondary optical element 20. The secondary optical element 20 is shown to be identical to the primary optical element 16, and is mirrored with the primary optical element 16 around the focal points 26.

The secondary optical element 20 may in fact be different from the primary optical element 16. This difference would depend on the specific application of the light module. If a user did not require generally parallel light, he could eliminate the secondary optical element altogether, which would result in a more diffuse light beam. This situation is illustrated in FIG. 4D.

The outbound light rays 22 emanate from the secondary lens segment 201, again with paths essentially parallel to the optic path axis. The type of optical elements shown herein are of the simple non-symmetric biconvex type, but many other types may be employed to obtain the desired results. A person knowledgeable in the art of optics could devise an endless number of optical elements to obtain the desired result of a reduction of the cross section and/or redirection of the light rays.

Figure 4B:
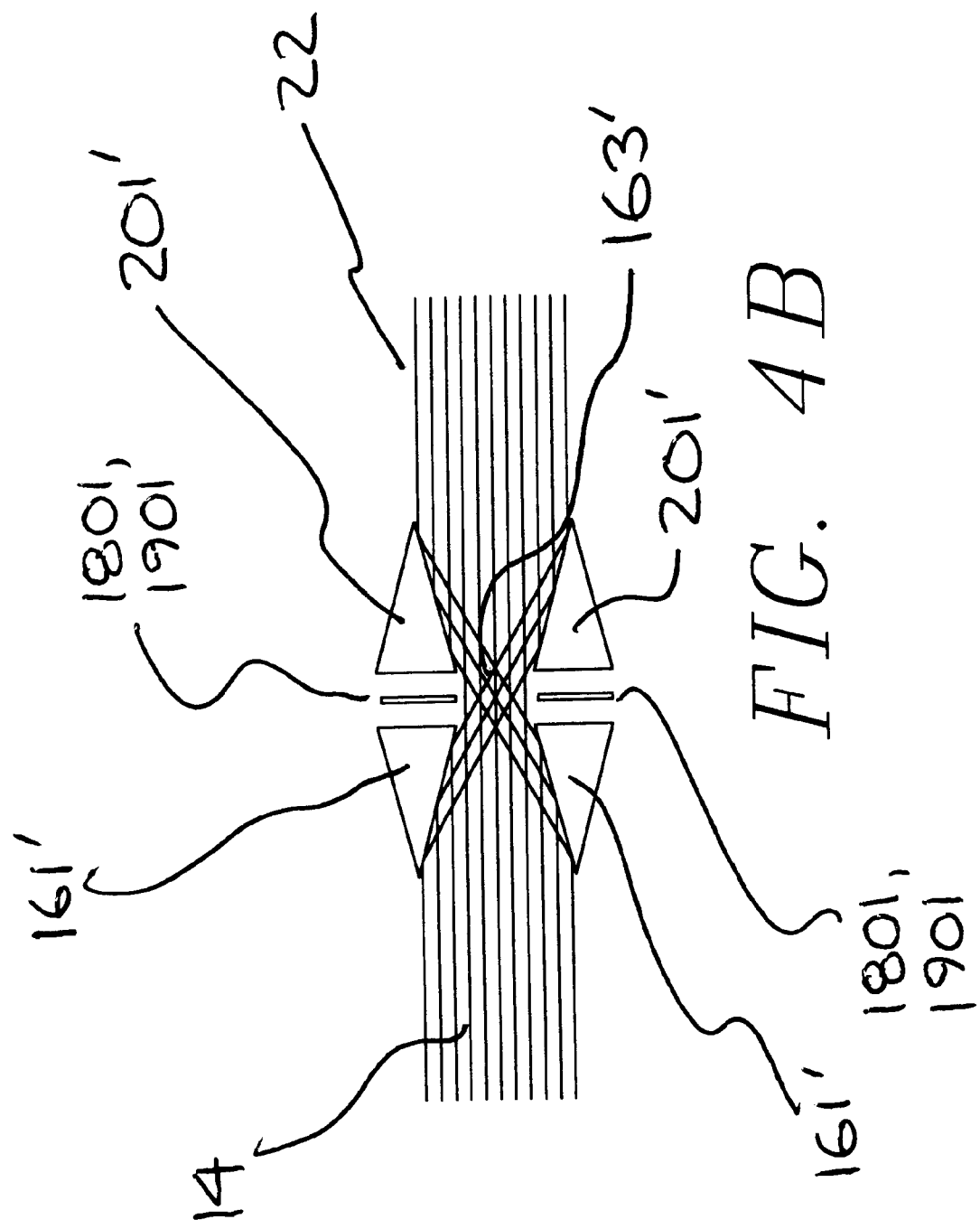
FIG. 4B shows a segment of the optical ray trace of an alternate system with two reflective optical elements.
Figure 4D:
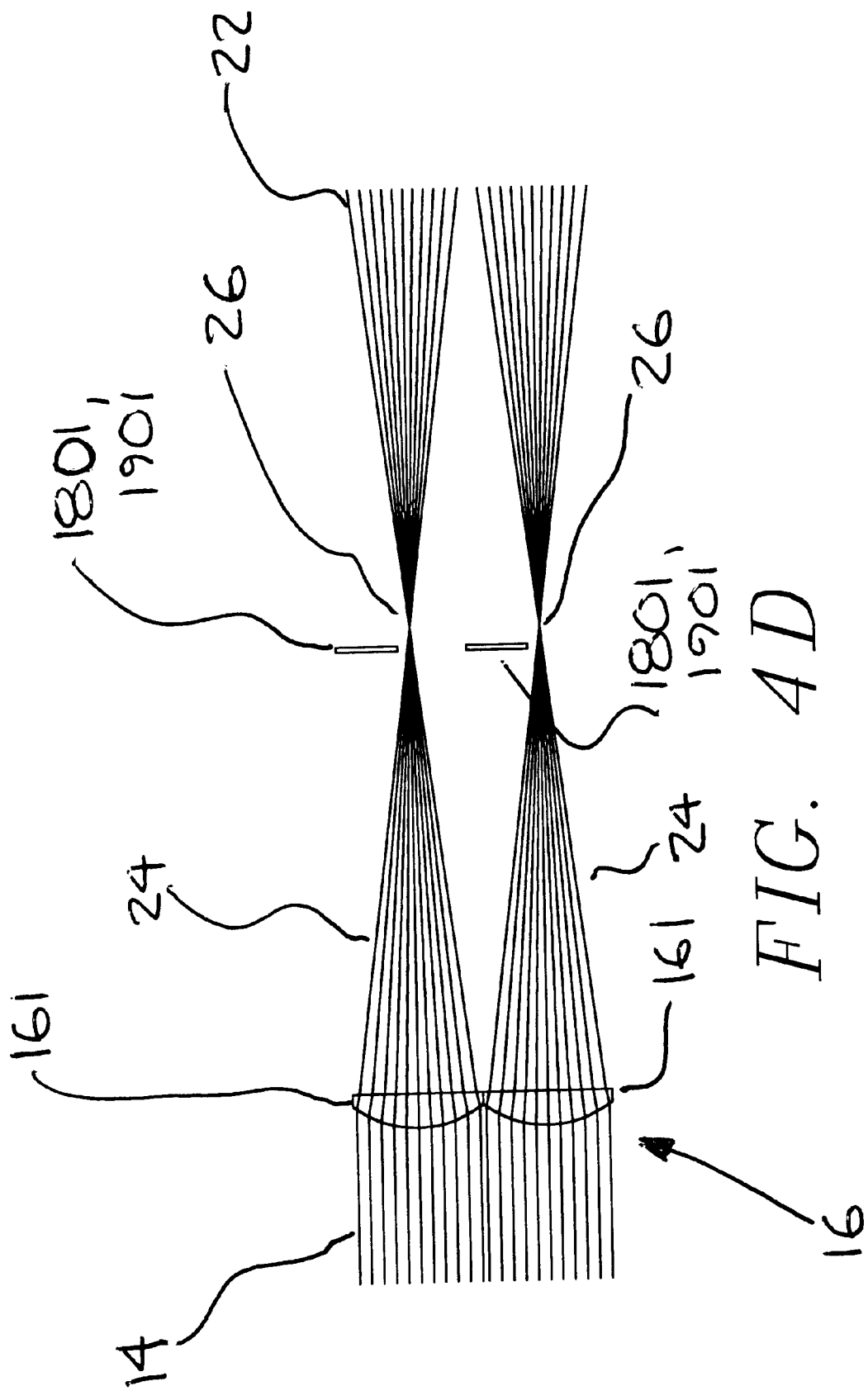
FIG. 4D shows a segment of the optical ray trace of a system with one refractive optical element.

A first alternate embodiment of the optical element of the present invention is shown in FIGS. 3B and 4B. FIG. 3B shows a perspective view of two of the reflective segments 161' emanating from the center 162' of the primary optical element 16'. The widths of the open segments 163' are equal to or less than the angular width of the reflective segments 161'. The open segments 163' are shown as being of equal width compared to the reflective segments 161'. The reflective segments 161' are equally spaced around the center 162' of the element 16' with the open spaces 163' separating the reflective segments 161'.

FIG. 4B is a ray trace that shows a side view of the operation of the first alternate embodiment of the device. Inbound light rays 14 pass unobstructed through the open segments 163' of the primary reflective optical element 16'. (Two reflective segments 161' are shown.) The light rays also pass unobstructed through equivalent openings in a secondary reflective optical element 20'. The secondary reflective optical element 20' is equivalent to the primary element 16' except that the secondary element 20' is oriented in the opposing direction along the axis of the optical path. As with the first preferred embodiment, the secondary element 20' may have a different configuration from the primary element 16', depending on the requirements of the specific application.

Inbound light rays 14 reflect off a reflective surface 161' of the primary reflective optical element 16'. The upper inbound light rays 14 reflect across an open space between a lower surface of an upper reflective segment 161' of the primary reflective element 16' and an upper surface of a lower reflective segment 201' of the secondary reflective element 20'. The lower inbound light rays 14 reflect off an upper surface of a lower primary reflective surface 161', across the open space, and reflect off a lower surface of an upper secondary reflective surface 201'. The secondary reflective surfaces 201' are parallel to the primary reflective surfaces 161'; therefore the outbound light rays 22 propagate to paths parallel to those of the inbound light rays 14. It should be noted that some of the light rays pass through the open space unaffected by the optical elements. It should also be noted that the light rays before and after the optical elements are parallel in direction but rearranged in location; that is, upper inbound rays end up being lower outbound rays, and vice versa.

A second alternate embodiment is shown in FIGS. 3C and 4C. FIG. 3C shows an optical element 16" similar to the first alternate embodiment, optical element 16'. However, optical element 16" has individual reflective segments 161" that are taller than those of optical element 16'. As in the first alternate embodiment, the reflective segments 161" are separated by open spaces 163" and are radially located about the center 162" of the optical element 16".

FIG. 4C is a ray trace that shows a side view of the operation of two reflective segments 161" of the primary optical element 16". Inbound light rays 14 pass unobstructed through the open space between a lower surface of an upper reflective segment and an upper surface of a lower reflective segment 161". Upper inbound light rays 14 reflect off a lower surface of the upper reflective surface 161" of the reflective element 16". Lower inbound light rays 14 reflect off an upper surface of the lower reflective surface 161". The narrow angle of divergence provided by the taller reflective segments 161" may be desirable in some lighting applications.

Both of the alternate embodiments shown use reflective elements as opposed to the refractive elements of the first preferred embodiment. In any embodiment using reflective elements, the amount of divergence of the light can be varied by changing the angle of the reflective surfaces to best fit the particular application. Modifications or imperfections in these reflective elements therefore have a more significant effect on the light path than similar changes in the refractive elements. Since the angle of reflection is equal to the angle of incidence, a 1° change in the angle of the reflective segment leads to a 2° change in the light path.

Each of the embodiments of the primary optical element 16, 16', 16" of the present invention include lens or reflective segments 161, 161', 161" that reduce the cross sectional area of an effected light region by at least one half. The structure of the primary optical elements, the utilizing of a plurality of segments within the lens, makes it possible for optical filters or other optical elements to be installed in the optic path while having no effect on the light until the filter or other elements are deployed. Once deployed, the filters change the projected light's properties.

All the optical components of the present invention are depicted in the drawings as radial arrays, but could just as easily be constructed as linear or matrix arrays, as illustrated in FIGS. 1A–B. If the arrays are linear or matrix, deployment of the diffusion elements is by linear motion, as opposed to the rotational motion used by the radial arrays. Deployment of the radial diffusion elements is described below in the "Operation of the Invention" section.

Referring again to FIG. 4A, the diffusion assembly 18 is centered around the optic path. The diffusion elements are oriented perpendicular to the longitudinal axis of the optic path. When in the non-deployed position, the diffusion elements are not in the path of the refracted light rays as they exit the primary optical element 16 and are reduced to focal points by the lens segments 161.

Figure 5:
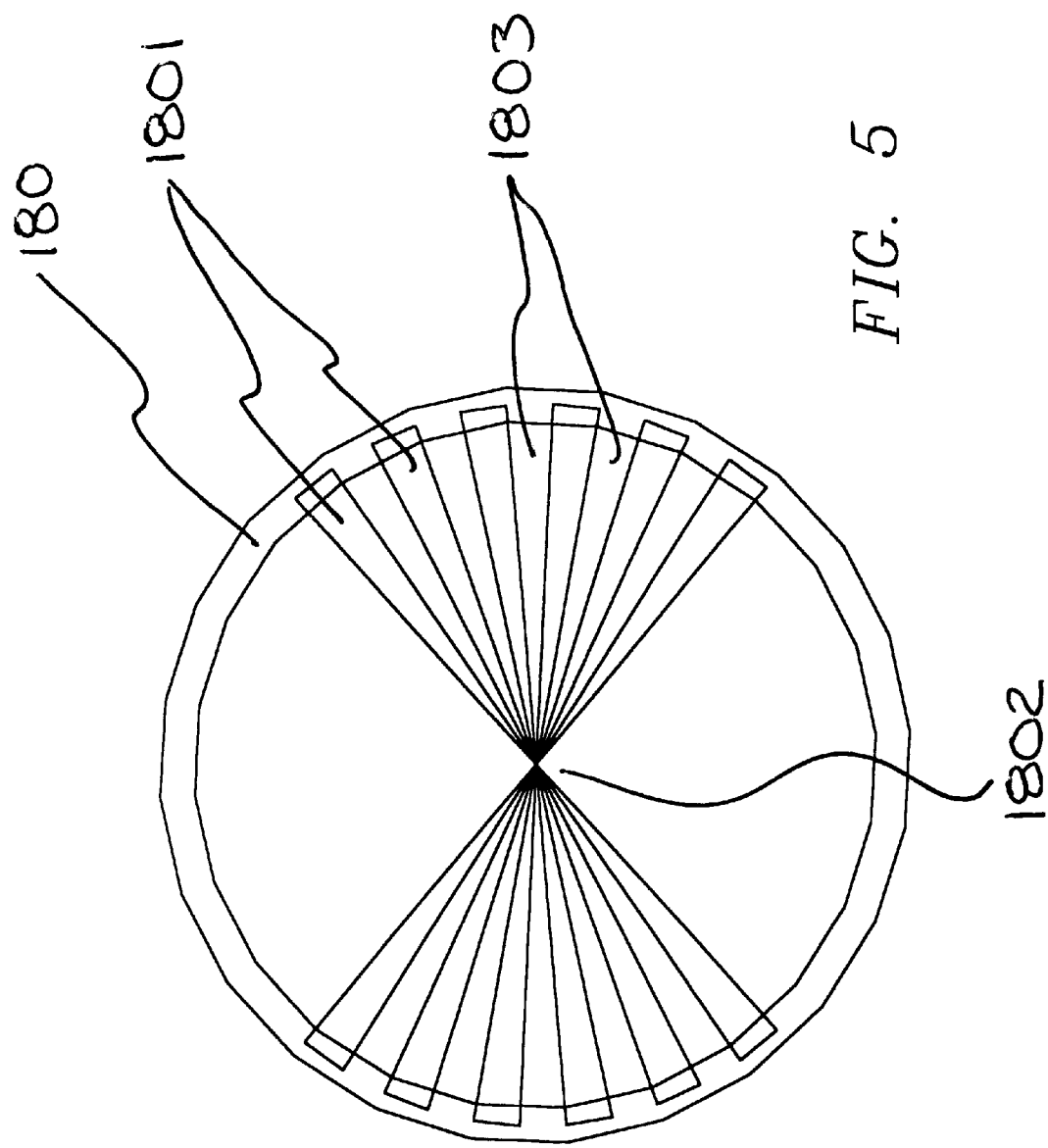
FIG. 5 is a detail view of the horizontal radial diffusion element assembly as viewed along the optical axis.

FIG. 5 shows a front view of a horizontal diffusion element 180 that is employed in the diffusion assembly 18. The construction is typical of any one of the multiple types of diffusion elements that can be utilized. A typical segment 1801 of a horizontal diffusion element 180 is wedge shaped and is radially located about the center 1802 of the diffusion element 180. The multiple wedge shaped diffusion element segments 1801 are attached to a frame 1804. The diffusion segments 1801 are separated by non-diffusing areas 1803. The non-diffusing areas 1803 may be either areas of clear material or open areas void of any material as shown. The number of diffusion element segments 1801 utilized is equal to one-half of the number of lens segments or reflective segments utilized in the optical elements.

The centers of the diffusion elements used and all the optical elements employed are coaxial. The line containing those centers defines the center line of the optic path in the device. The frames of the diffusion elements are constrained to rotate about the center line of the optic path. Any number of methods can be chosen to constrain the diffusion elements to this type of motion. Rotational movement of any of the diffusion elements about the optical axis results in the diffusion elements being introduced into the light path, and therefore interrupting the light.

Figure 6:
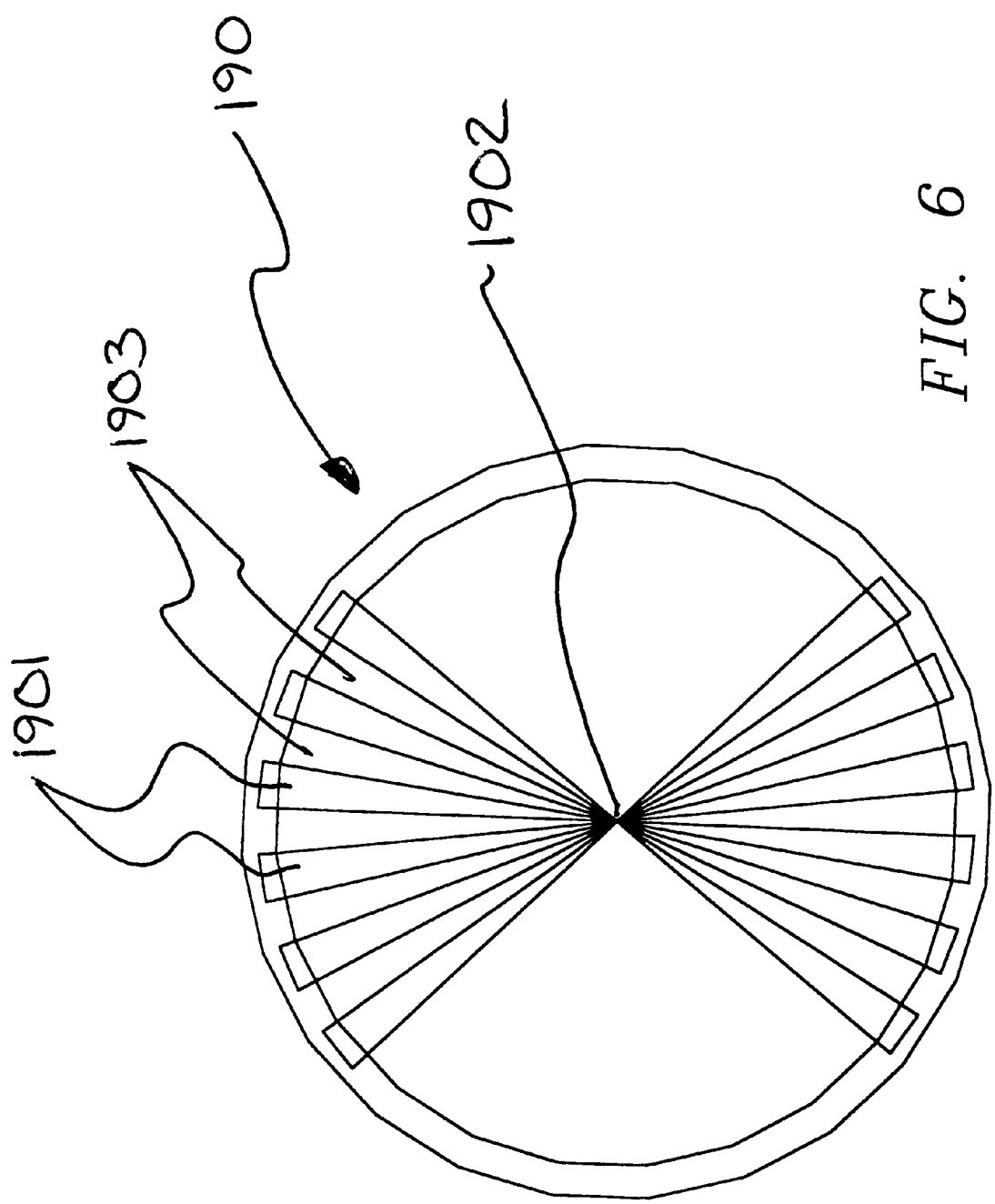
FIG. 6 is a detail view of the vertical radial diffusion element assembly as viewed along the optical axis.

A vertical radial diffusion element 190 is shown in FIG. 6. It is identical in construction to the horizontal radial diffusion element 180 except that the vertical diffusion element 190 is oriented with its diffusion element segments 1901 located in top and bottom quadrants of the vertical diffusion element 190 as opposed to the horizontal diffusion element segments 1801, which are located in left and right quadrants of the horizontal diffusion element 180.

Figure 7:
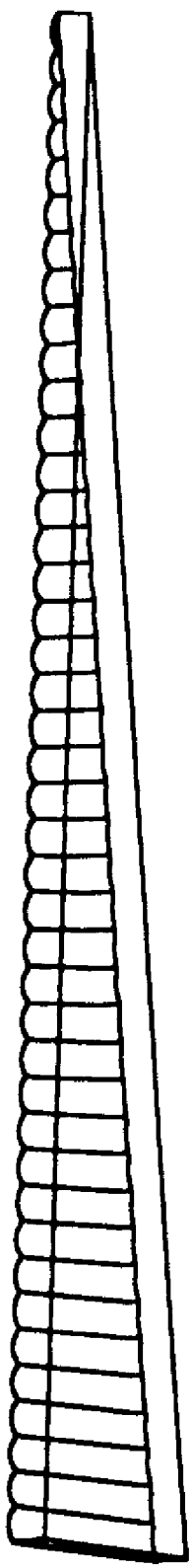
FIG. 7 is a perspective view of a radial diffusion element.
Figure 8A:
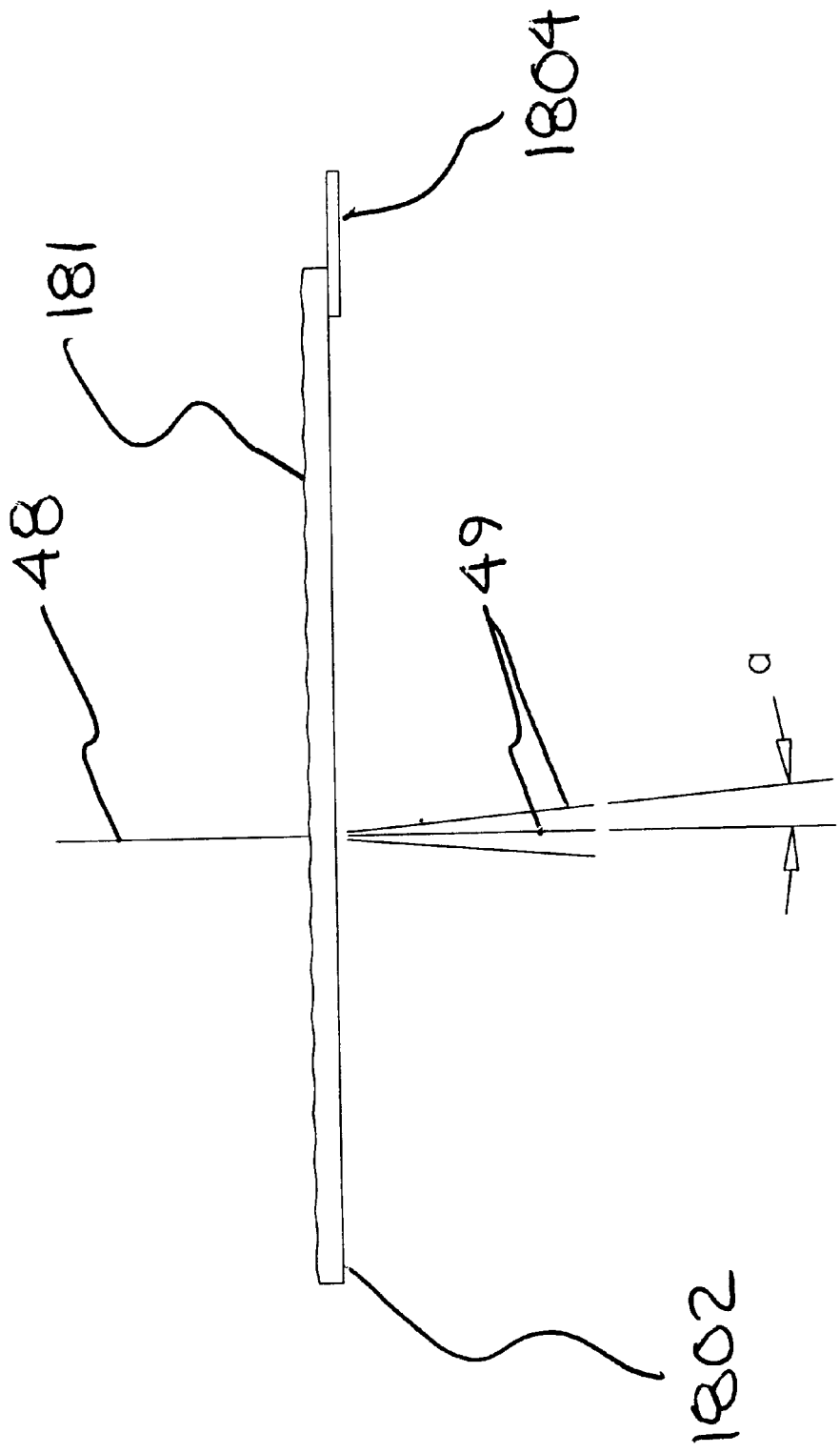
FIG. 8A is a cross section view of a leading edge of a radial diffusion element segment with ray trace.
Figure 8B:
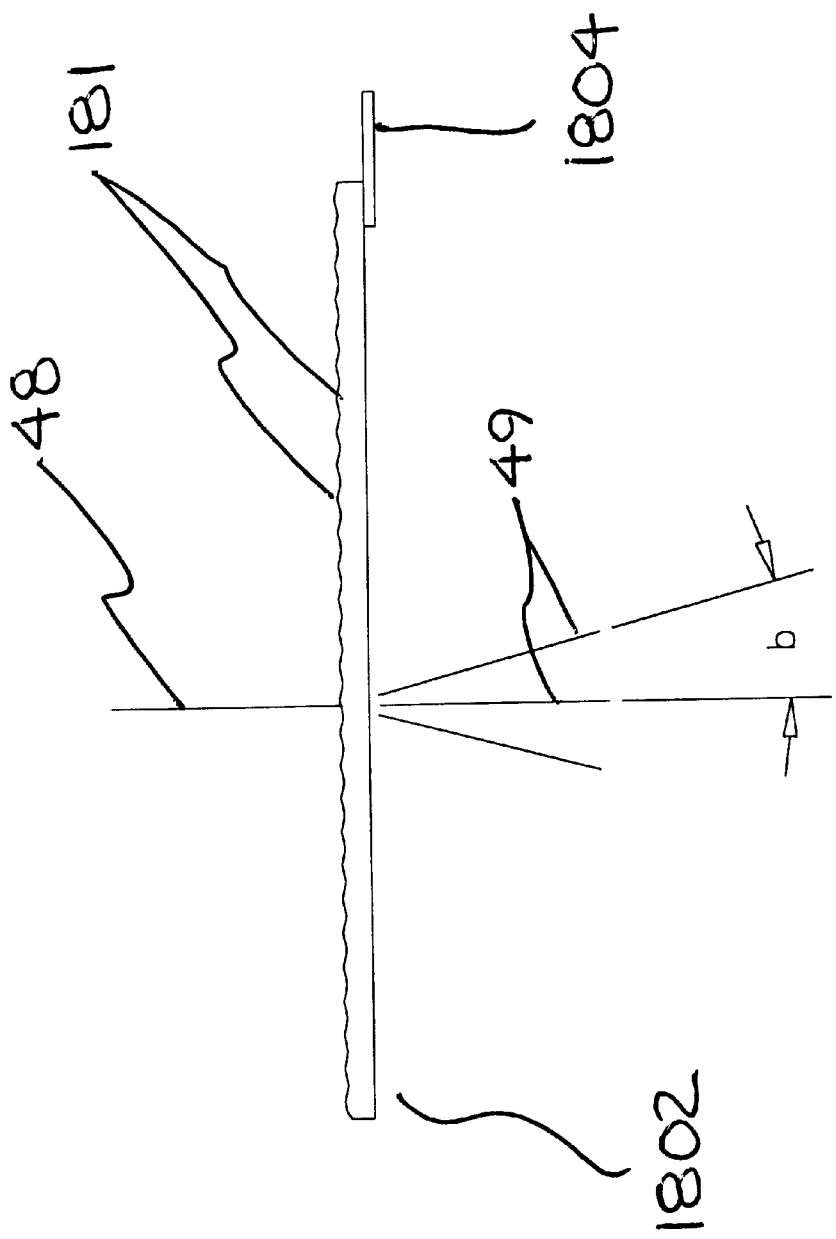
FIG. 8B is a cross section view of a trailing edge of a radial diffusion element segment with ray trace.
Figure 9A:
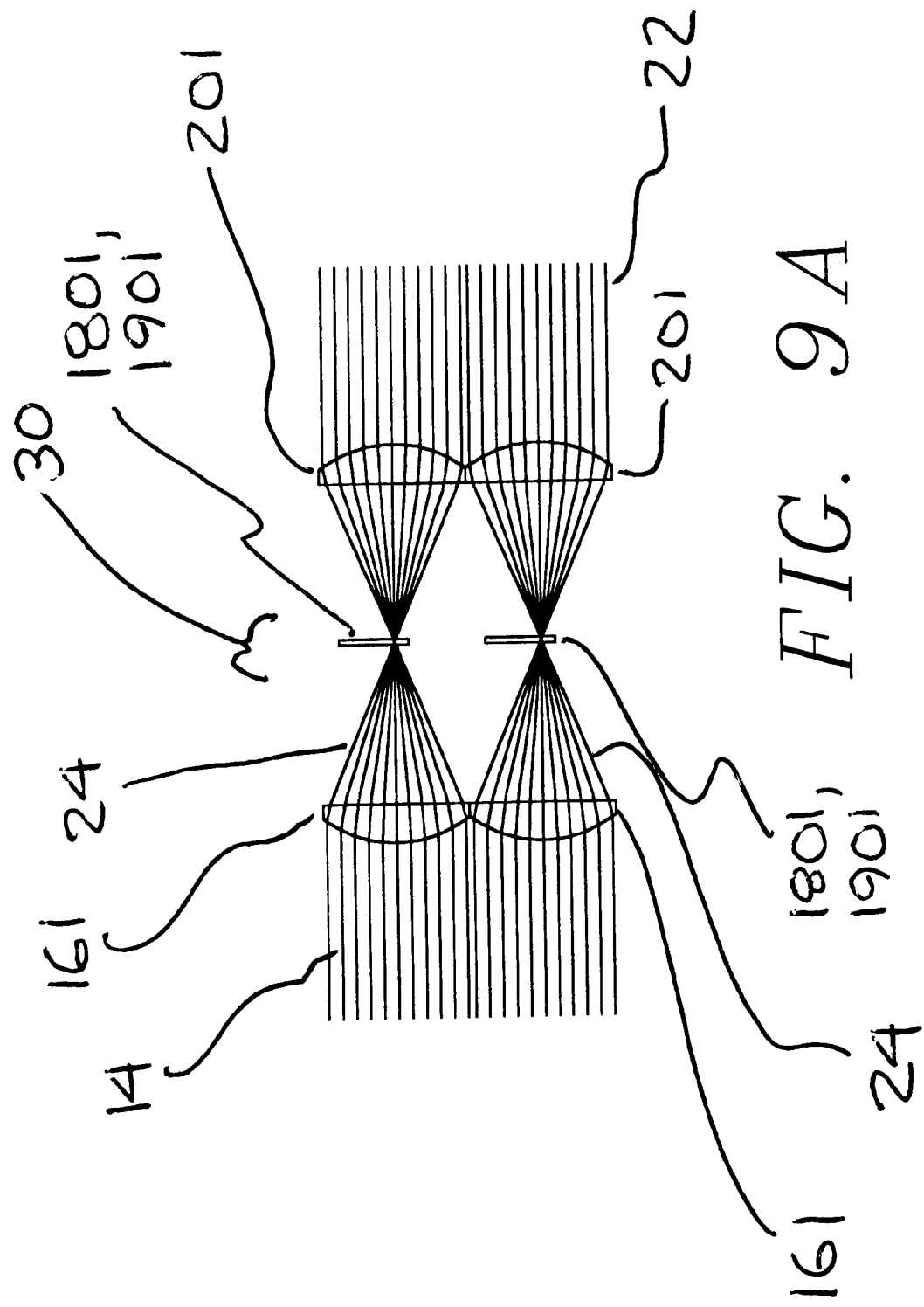
FIG. 9A shows a segment of the optical ray trace of the double refractive element system with a diffusion segment partially deployed in the light path.
Figure 9C:
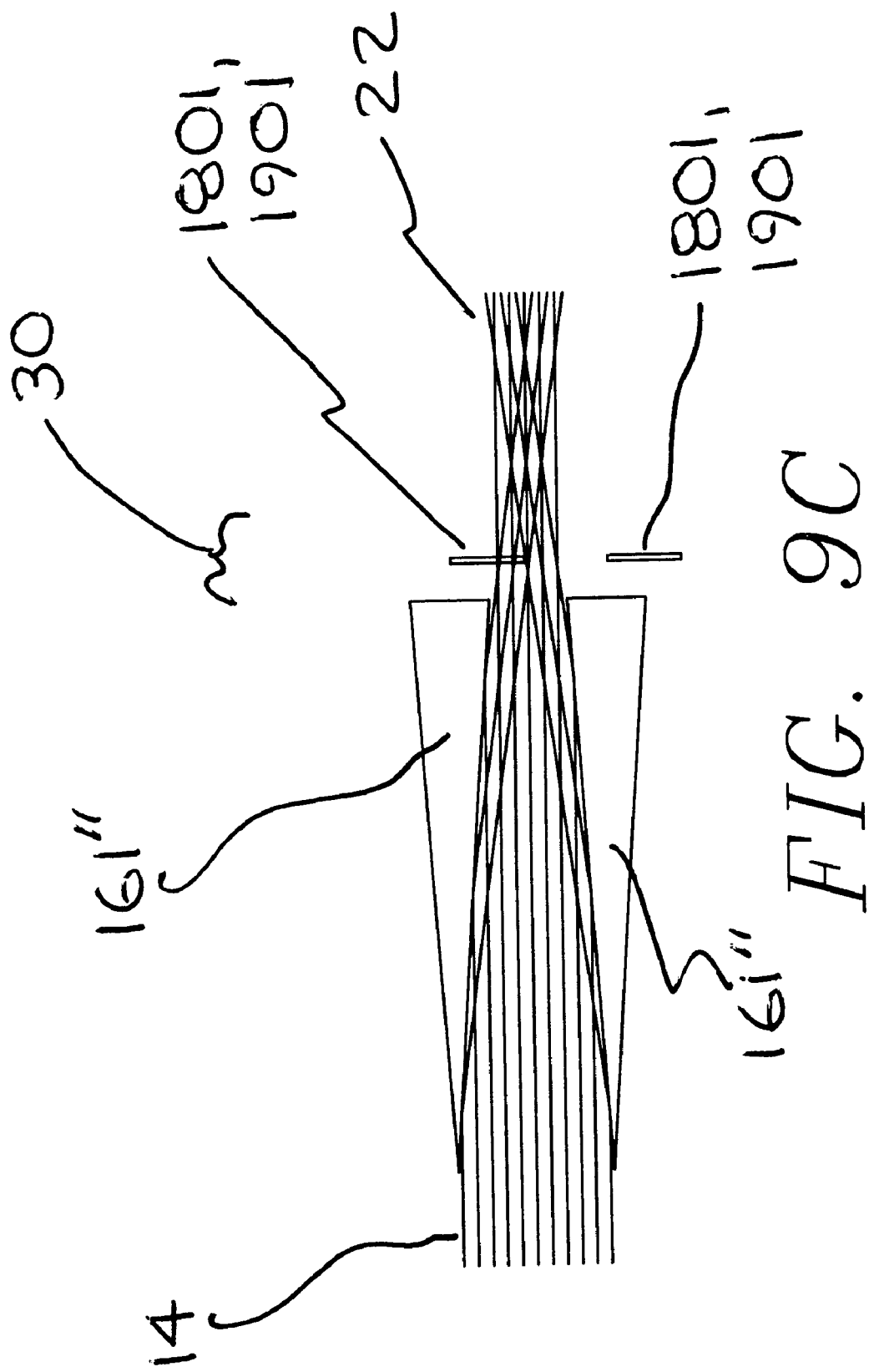
FIG. 9C shows a segment of the optical ray trace of the single reflective element system with a diffusion segment partially deployed in the light path.
Figure 9D:
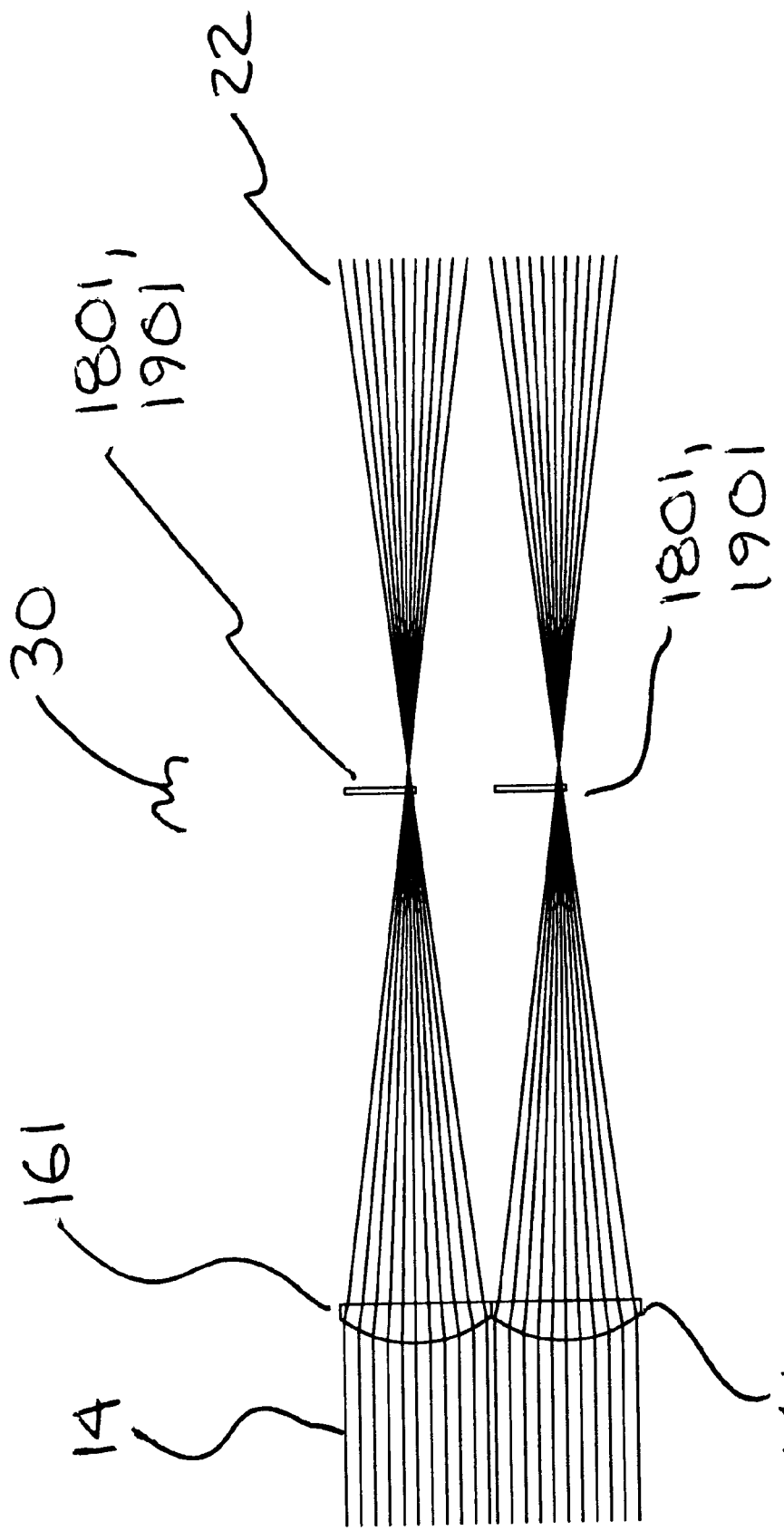
FIG. 9D shows a segment of the optical ray trace of the single refractive element system with a diffusion segment partially deployed in the light path.
Figure 10:
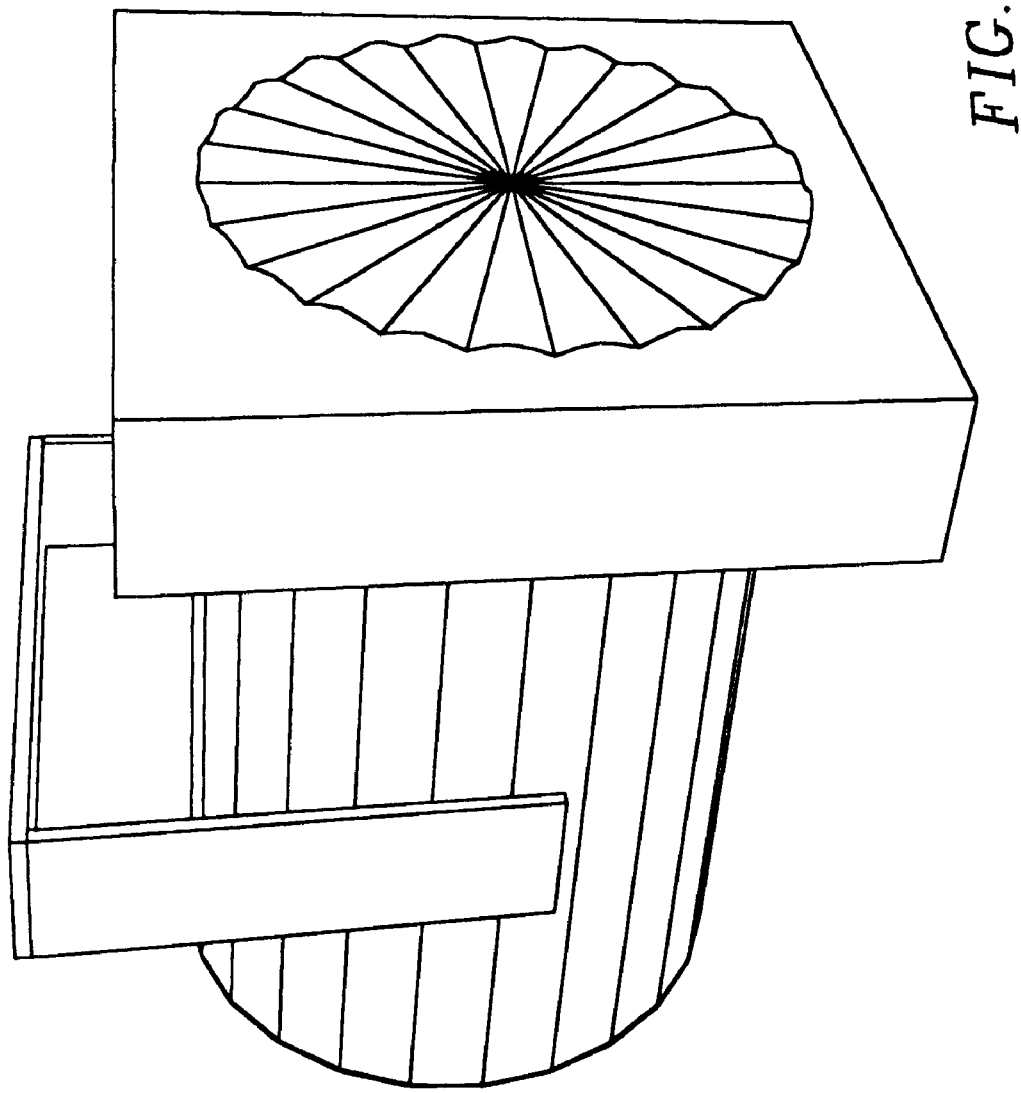
FIG. 10 illustrates a device constructed according to the present invention.
Figure 11:
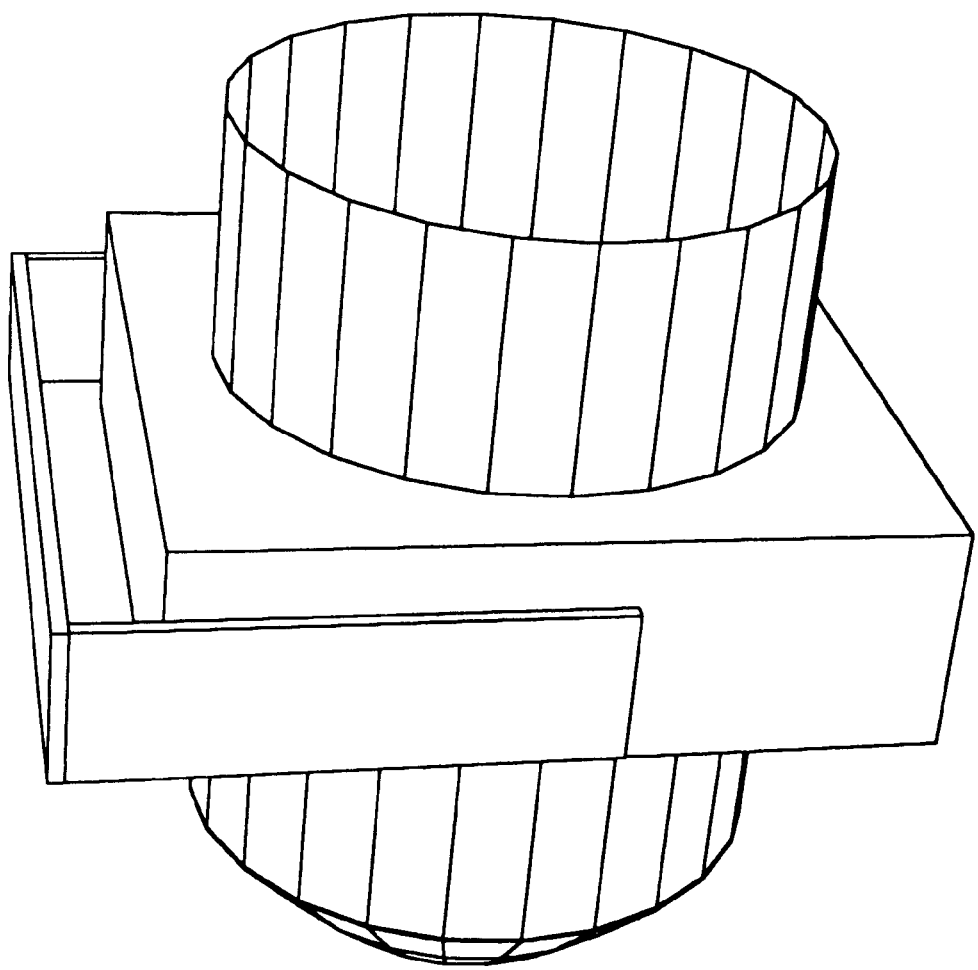
FIG. 11 illustrates another device constructed according to the present invention.

All of the diffusion element segments 1801, 1901 have a leading edge (as shown in FIG. 8A), and a trailing edge (as shown in FIG. 8B). The leading edges of the segments are defined by assuming clockwise rotation of the diffusion elements 18, 19. It can be seen in the perspective view of FIG. 7 that the surface irregularities 181 on the leading edges of the segments are less pronounced than those on the trailing edges.

A cross section view of a leading edge is shown in FIG. 8A. The incoming light rays 48 are shown striking the surface of the diffusion segment. They are generally perpendicular to the surface of the diffusion segment. The surface irregularities 181 of the diffusion segment refract the light from its initial direction. The surface irregularities 181 can be continuous, noncontinuous, linear, nonlinear, random or any type that would diffuse the light. Using these types of irregularities to diffuse the light would be well known to one skilled in the art.

Refracted light 49 exits the diffusion segment at angle a. The surface irregularities 181 are oriented in generally a radial direction about the optical axis. This results in the refraction, and therefore the diffusion, being only in the radial direction. Since the surface irregularities are mild on the leading edges, a lesser radial refraction of the light occurs as opposed to the more significant radial refraction caused by the larger irregularities on the trailing edges. Therefore the radial diffusion of the light is greater on the trailing edge of the segment than on the leading edge.

The amount of surface irregularities 181 changes radially from the leading edge to the trailing edge of the diffusion segment. The rate of change may be continuous or non-continuous, and may change at any rate. The change function of the magnitude of the surface irregularities would be dependant on the particular application of the invention.

A cross section of a trailing edge, with its larger irregularities 181, is shown in FIG. 8B. The generally perpendicular incoming light rays 48 are shown striking the surface of the diffusion segment. Due to the larger size of the irregularities 181 on the trailing edge, refracted light 49 exits the diffusion segment at angle b. Trailing edge exit angle b is larger than leading edge exit angle a due to the larger irregularities on the trailing edge of the diffusion segment.

The diffusion elements can be fabricated by any one of many means known to those skilled in the art to obtain equivalent results in the device. The diffusion element may for some applications be of constant diffusion over its entire surface.

Operation of the Invention

Referring now to FIGS. 4A–D, when the diffusion elements 180, 190 are in the non-deployed position, the center lines of the diffusion element segments 1801, 1901 are aligned between the focal lines or the open spaces of the primary optical element 16, 16', 16". When the diffusion elements 180, 190 are to be deployed, they are rotated so that the diffusion element segments 1801, 1901 begin to intersect the refracted or reflected light rays from the lens segments of the primary optical element 16, 16', 16".

In FIGS. 9A–D, the diffusion element 180, 190 has been rotated so that a diffusion element segment 1801, 1901 begins to impinge on the light region. In all the embodiments, the diffusion assembly 18 is placed in the optic path in an area 30 where the lens or reflective segments 161, 161', 161" have reduced the cross section of the light regions. Thus the rotation of one of the diffusion elements 180, 190 causes the diffusion element to affect the light. If more effect from the diffusion element is desired, the diffusion element is rotated further so that the diffusion element segments 1801, 1901 are completely in the light path. All the diffusion elements 180, 190 in the diffusion element assembly 18 are deployed in this manner. Again, the lens or reflective segments of the primary optical elements breaking the light into multiple regions of reduced cross section is what allows this unique deployment of the diffusion elements 180, 190. The diffusion elements 180, 190 are invisible to the light until the diffusion elements 180, 190 are rotated within the light path. The degree of diffusion of the light is therefore related to the degree of movement of the diffusion element.

The movement of the diffusion elements 180 in and out of the reduced area can be done manually, or it can be controlled by a motor or solenoid utilizing remote or computer control. An individual knowledgeable in the art of motor or solenoid control could devise numerous ways to control the deployment of the diffusion elements 180, 190.

Rotation of the horizontal radial diffusion element 180 into the light path results in the light being diffused into an oval beam with its longer axis in the horizontal direction. When the vertical radial diffusion element 190 is rotated into the light path, the light is diffused into an oval beam with its longer axis in the vertical direction. The rotation of both diffusion elements 180, 190 into the light path results in an increase in diameter of the light beam. Again, if linear or matrix arrays are utilized, the movement of the diffusion elements 180, 190 into the light path would be linear movement as opposed to rotational.

Movement of the entire diffusion assembly 18 or of both the vertical diffusion element 180 and the horizontal diffusion element 190 simultaneously allows the shaping of the beam at angles other than horizontal and vertical. Rotating the entire diffusion assembly 18 or both the vertical diffusion element 180 and the horizontal diffusion element 190 simultaneously through 45° would result in the light beam being shaped at 45° and 135°, as opposed to 0° and 90°.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A device to project various sizes and shapes of a light beam comprising:

a light source that generates generally parallel light along an optic path, a primary optical element comprising an array of optic segments to create an area in said optic path where said light from said light source is divided into a plurality of light regions, each said light region is reduced in area after passing through said optic segment, and a diffusion means comprising at least one diffusion element, each said diffusion element comprises an array of diffusion element segments, said diffusion means is located in said optic path past said primary optic means; wherein said diffusion means is deployed by moving said diffusion means from a non-deployed position in which said diffusion elements do not impinge said light regions to a deployed position in which said diffusion elements impinge said light regions, and an effect of said diffusion elements is controlled in degree by controlling an amount of impingement of said diffusion elements on said light regions.

2. The light projecting device of claim 1 wherein:

said array of optic segments of said primary optical element is a radial array.

3. The light projecting device of claim 1 wherein:

said array of diffusion element segments of said diffusion means is a radial array.

4. The light projecting device of claim 1 wherein:

said array of optic segments of said primary optical element is a linear array.

5. The light projecting device of claim 1 wherein:

said array of diffusion element segments of said diffusion means is a linear array.

6. The light projecting device of claim 1 wherein:

said array of optic segments of said primary optical element is a matrix array.

7. The light projecting device of claim 1 wherein:

said array of diffusion element segments of said diffusion means is a matrix array.

8. The light projecting device of claim 1 wherein:

the number of said diffusion element segments in a first diffusion element equals one-half the number of said optic segments, said diffusion element segments in said first diffusion element are equally distributed in a left and a right quadrant of said first diffusion element, and the number of said diffusion element segments in a second diffusion element equals one-half the number of said optic segments, said diffusion element segments in said second diffusion element are equally distributed in a top and a bottom quadrant of said first diffusion element.

9. The light projecting device of claim 1 wherein:

a secondary optical element is installed in said optic path after said filter means to redirect said light so that light projected from said device has a projected direction substantially the same as a projected direction of the light directed at said primary optical element.

10. The light projecting device of claim 1 wherein:

said primary optical element comprises lens segments.

11. The light projecting device of claim 1 wherein:

said primary optical element comprises reflective segments.

12. The light projecting device of claim 1 wherein:

said diffusion element segments comprise surface irregularities to refract said generally parallel light, said surface irregularities are oriented in generally a radial direction about said optical axis such that refraction, and therefore diffusion, are in a radial direction.

13. The light projecting device of claim 12 wherein:

surface irregularities on leading edges of said diffusion element segments are smaller that said surface irregularities on trailing edges of said diffusion element segments such that said refraction of said generally parallel light at said leading edges is lesser than said refraction of said generally parallel light at said trailing edges.

* * * * *